US011585355B2

(12) United States Patent
Lam et al.

(10) Patent No.: US 11,585,355 B2
(45) Date of Patent: Feb. 21, 2023

(54) ELECTRIC SUBMERSIBLE PUMP WITH REDUCED VIBRATION

(71) Applicant: Schlumberger Technology Corporation, Sugar Land, TX (US)

(72) Inventors: Hao Lam, Richmond, TX (US); Arthur I. Watson, Sugar Land, TX (US); Jacques Orban, Katy, TX (US); Lauro De Camargo, Macae-RJ (BR); David Milton Eslinger, Collinsville, OK (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 158 days.

(21) Appl. No.: 16/544,668

(22) Filed: Aug. 19, 2019

(65) Prior Publication Data

US 2020/0116164 A1    Apr. 16, 2020

Related U.S. Application Data

(63) Continuation of application No. 14/917,563, filed as application No. PCT/US2014/055595 on Sep. 15, 2014, now Pat. No. 10,385,875.

(Continued)

(51) Int. Cl.
*F04D 29/66* (2006.01)
*F04D 29/046* (2006.01)
(Continued)

(52) U.S. Cl.
CPC ............. *F04D 29/66* (2013.01); *F04B 51/00* (2013.01); *F04D 13/0633* (2013.01);
(Continued)

(58) Field of Classification Search
CPC ...... F04D 29/66; F04D 13/0633; F04D 13/08; F04D 13/086; F04D 13/10; F04D 29/046; F04D 29/666; Y10T 464/50
(Continued)

(56) References Cited

U.S. PATENT DOCUMENTS 1,776,125 A    9/1930 Linn
2,889,695 A    6/1959 Kurt
(Continued)

FOREIGN PATENT DOCUMENTS

EP    1574719 A2    9/2005
JP    2004286045 A    10/2004

OTHER PUBLICATIONS

Flatern, Rick von, "Electric Submersible Pumps" Oilfield Review 2015, retrieved from the Internet Nov. 3, 2021, at <https://www.slb.com/resource-library/oilfield-review/defining-series/defining-esp>. (Year: 2015).*
(Continued)

*Primary Examiner* — Greg Binda

(57) ABSTRACT

An electric submersible pump (ESP) with reduced vibration is provided. In an implementation, an ESP section has radial bearings placed at shaft locations of reduced vibration to reduce wear. The locations of reduced vibration are selected to avoid areas of high vibration and vibrational waves that reinforce each other due to structure resonance and natural excitation frequencies. In an implementation, a radial bearing is positioned at a node of reduced vibration of a standing vibrational wave. In an implementation, a succession of multiple radial bearings are spaced at different intervals from each other to avoid conventional even spacing of the bearings that causes standing waves, resonance waves, and vibrational waves at natural excitation frequencies. In an implementation, a span between adjacent radial bearings is selected to spare other adjacent bearings at different spans
(Continued)

the effects of vibrations that may extend over a range of excitation frequencies in the ESP section.

6 Claims, 9 Drawing Sheets

Related U.S. Application Data

(60) Provisional application No. 61/877,998, filed on Sep. 15, 2013.

(51) Int. Cl.
| | | |
|---|---|---|
| *F04D 13/10* | (2006.01) | |
| *F04D 13/06* | (2006.01) | |
| *F04D 13/08* | (2006.01) | |
| *F16F 15/10* | (2006.01) | |
| *F04B 51/00* | (2006.01) | |

(52) U.S. Cl.
CPC ........... *F04D 13/08* (2013.01); *F04D 13/086* (2013.01); *F04D 13/10* (2013.01); *F04D 29/046* (2013.01); *F04D 29/666* (2013.01); *F16F 15/10* (2013.01)

(58) Field of Classification Search
USPC .......................................... 417/423.3, 423.12
See application file for complete search history.

(56) References Cited

U.S. PATENT DOCUMENTS

| | | | |
|---|---|---|---|
| 4,350,911 A | | 9/1982 | Wilson et al. |
| 4,747,799 A | | 5/1988 | Kato |
| 5,711,371 A | * | 1/1998 | Bingham .............. E21B 43/121 |
| | | | 417/423.3 |
| 6,033,312 A | | 3/2000 | Bohm |
| 6,997,812 B2 | | 2/2006 | Sasaki et al. |
| 7,022,019 B2 | | 4/2006 | Christopher |
| 8,162,596 B1 | | 4/2012 | Kamio |
| 8,851,864 B2 | * | 10/2014 | Prieto ...................... H02K 7/16 |
| | | | 417/423.3 |
| 9,528,544 B2 | | 12/2016 | Kobayashi |
| 9,631,630 B2 | * | 4/2017 | Collie .................. F16C 25/083 |
| 10,385,875 B2 | | 8/2019 | Lam et al. |
| 2013/0058797 A1 | | 3/2013 | Prieto et al. |

OTHER PUBLICATIONS

Search Report and Written Opinion of International Application No. PCT/US2014/055595, dated Dec. 8, 2014, 8 pages.

Examination Report for corresponding GB Application No. GB1603441. 5, dated Mar. 28, 2017, 3 pages.

* cited by examiner

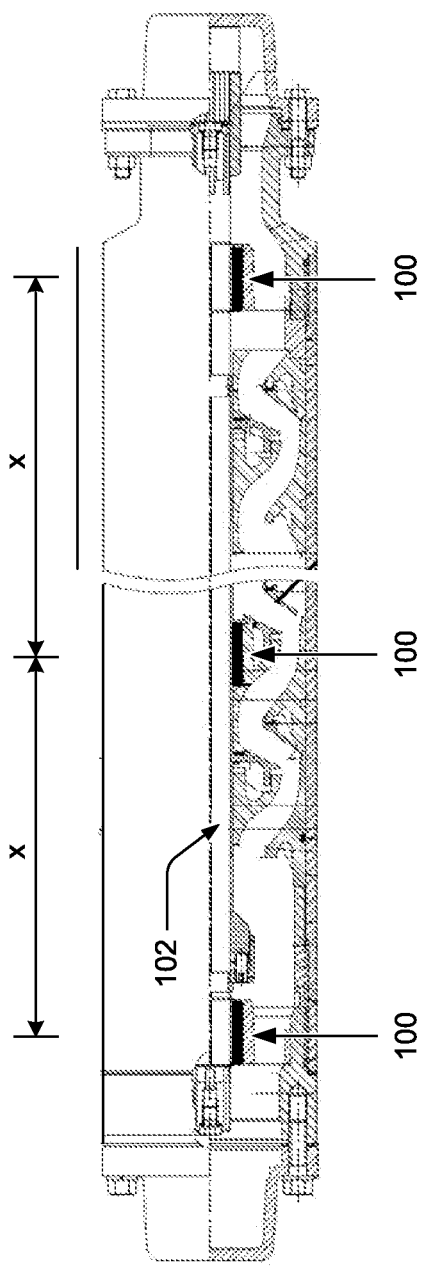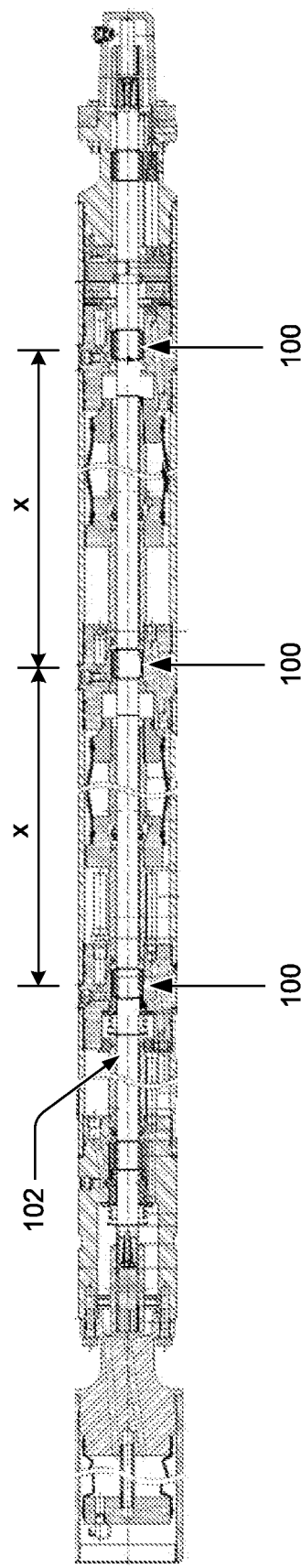
FIG. 1A (PRIOR ART)
FIG. 1B (PRIOR ART)

ELECTRIC SUBMERSIBLE PUMP WITH REDUCED VIBRATION

RELATED APPLICATIONS

This patent application is a Continuation application of Ser. No. 14/917,563, filed Mar. 8, 2016, now U.S. Pat. No. 10,385,875, which is the National Stage of International Application No. PCT/US2014/055595, filed Sep. 15, 2014, which claims the benefit of priority to U.S. Provisional Patent Application No. 61/877,998 to Lam et al., filed Sep. 15, 2013, each of which is incorporated by reference herein in its entirety.

BACKGROUND

Electric submersible pumps may have multiple pump stages, motors, and protector sections stacked in a single ESP string. Each segment in the string may have radial bearings in that section that support a rotating shaft for that segment. The shafts of the various segments in the string are coupled together mechanically, end-to-end, axially. Conventional ESP pumps intended for use in abrasive applications, for example, may have several ARZ (abrasion-resistant zirconia) radial bearings spaced at roughly equal intervals along the longitudinal axis in the stack of stages. For example, the interval may be approximately ten inches. Such ARZ radial bearings may consist of a ceramic sleeve keyed to the rotating pump shaft and a ceramic bushing located in a bearing carrier. These spaced radial bearings are important in maintaining shaft radial location and minimizing pump vibration in abrasive applications where an initial close-fitting radial bearing pair between mating impeller and diffuser hubs becomes significantly worn and provides minimal shaft support.

As shown in FIGS. 1A and 1B, conventional radial bearings 100 for the shaft 102 of a given single ESP section are evenly spaced, at roughly equal intervals "x", although the equal intervals may be unique for each section. For example, ESP protectors have radial bearings located at approximately equal intervals determined by length of the protector module. Similarly, ESP motors have radial bearings located at approximately equal intervals as determined by length of the rotor sections. Thus, each pump, protector, and motor section has evenly spaced bearings 100 to provide accurate location and alignment of each high-speed shaft 102 for the associated section, and to hold the shaft 102 for that section true, in spite of shaft vibration. However, radial wear of these bearings 100 and subsequent loss of accurate radial location of the shaft 102 is directly related to radial reaction loads on each bearing 100. A significant portion of the radial reaction loads is caused by vibration.

SUMMARY

An apparatus includes at least one electric submersible pump (ESP) section, and at least a shaft for rotation in the ESP section. In an implementation, the ESP section has locations of increased vibration and locations of decreased vibration along the shaft due to at least one natural frequency of vibration of the ESP section and shaft. A bearing for radial support of the shaft is positioned at a location of reduced vibration along the shaft. In an implementation, an ESP section has at least one shaft section capable of rotation, at least four successive radial bearings along the at least one shaft section, and a first bearing span between two adjacent radial bearings of the at least four successive radial bearings with a length at least 5% different then at least a second bearing span between two other adjacent radial bearings of the at least four successive radial bearings. An example method includes detecting a location of reduced vibration along a shaft of an electric submersible pump (ESP) component, and positioning a radial bearing to support the shaft at the location of reduced vibration. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIGS. 1A and 1B are diagrams of conventional ESP stages that have radial bearings located at regular intervals, causing vibrational resonance and standing waves that increase wear on the radial bearings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Example Systems

Example systems described herein reduce vibrations of the shaft 102 and vibrations and subsequent wear of radial bearings 100 in electric submersible pumps (ESPs) similar to the ESPs illustrated in FIGS. 1A and 1B. An example system may reduce vibration of the shaft 102 and wear of radial bearings 100 by placing the radial bearings 100 at shaft locations of low vibrational energy. The example system may also space adjacent or nearby radial bearings 100 in each of the pump, protector, and motor sections of an ESP at different intervals, irregular intervals, or at intervals specifically calculated to reduce or defeat the wave and vibration phenomena that increase wear on the radial bearings 100 and shaft 102.

The spans between bearings 100 may be varied so that one bearing 100 can spare other bearings from vibrational wear. The example spacing for the bearings 100 can reduce the effect of destructive resonance of vibrating components, and minimize the effects of vibrational waves reinforcing each other at the location of a bearing 100.

Figure 2:
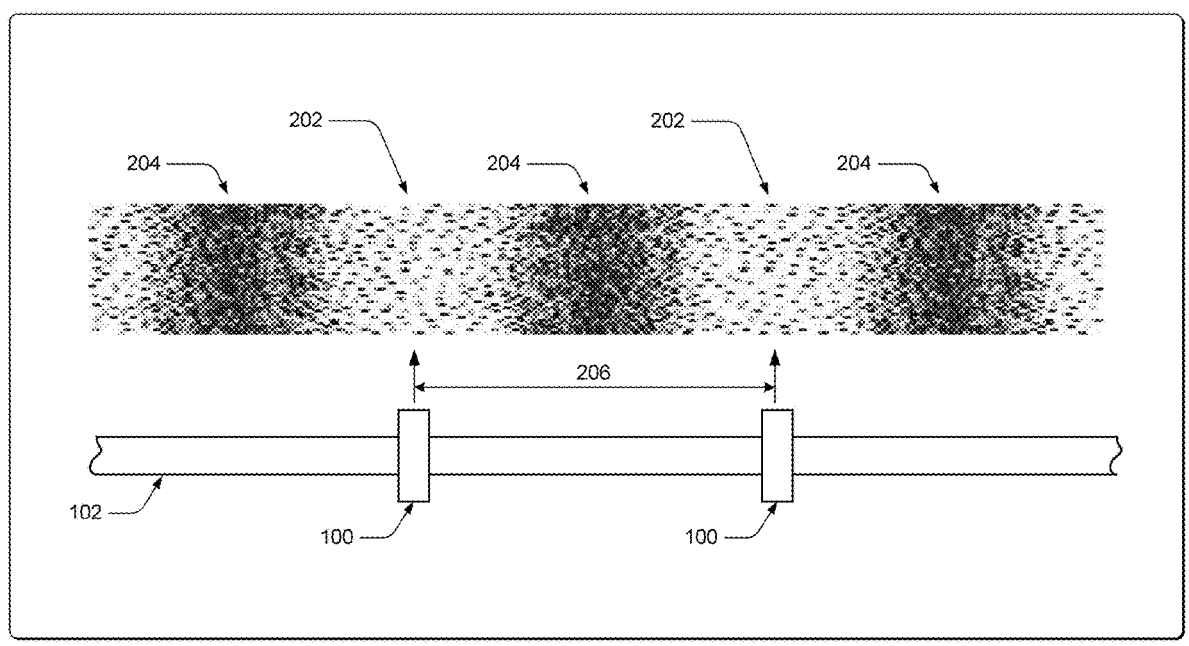
FIG. 2 is a diagram of an ESP component with radial bearings for a shaft located at nodes of decreased vibrational energy.

FIG. 2 shows an example ESP shaft 102 with radial bearings 100 located at nodes 202 of minimum vibration when the host ESP component (pump, protector, or motor) undergoes a standing vibrational wave, or undergoes vibration from a range of excitation frequencies. The location of bearings 100 also avoids antinodes 204 of the vibrational waves, where vibrational amplitude is at a maximum. This anti-vibration bearing spacing 206 can be used with submersible pumps and associated components, including those driven by electric power (ESP), driven by a shaft from the surface, or driven by fluid power. Thus, an example ESP section has bearings 100 located near the nodes 202, where the amplitude is minimized, rather than at or near the antinodes 204.

In an implementation, an example system reduces ESP shaft vibrations and subsequent wear of radial bearings 100 by spacing neighboring or adjacent radial bearings 100 in each of the pump, protector, and motor at specifically selected or varying (e.g., irregular) intervals along the rotating shaft 102. The undesirable vibrations can be excited by shaft rotation itself, by gas slugging, and by a host of other causes: such as vibration of slightly worn bearings 100 resonating with the geometry of the section structure, interaction of high-speed moving parts (e.g., the bearings 100) with abrasive particulates in the fluid being pumped, by slight shaft misalignment, which is common, and by movement of fluid through the hardware, especially when high-speed pump components interact with fluids containing dissolved and undissolved gases, and oil and water phases of different densities. The example system aims to place bearings 100 in locations along the shaft 102 that avoid areas of increased vibration in the section and that avoid vibration wave antinodes 204, where vibration is maximum or reinforced.

When the natural frequency of excitation of a bearing span, including the shaft 102, coincides with the frequency of excitation of the ESP section, the structure resonates during operation, producing much higher amplitudes of vibration than non-resonant vibration of the structure. In an implementation, an example system has a distance between bearings 100 that forms a span of the shaft 102 and resulting support structure with a natural frequency of excitation that does not coincide with the overall resonant excitation frequency of the ESP section structure.

Figure 3:
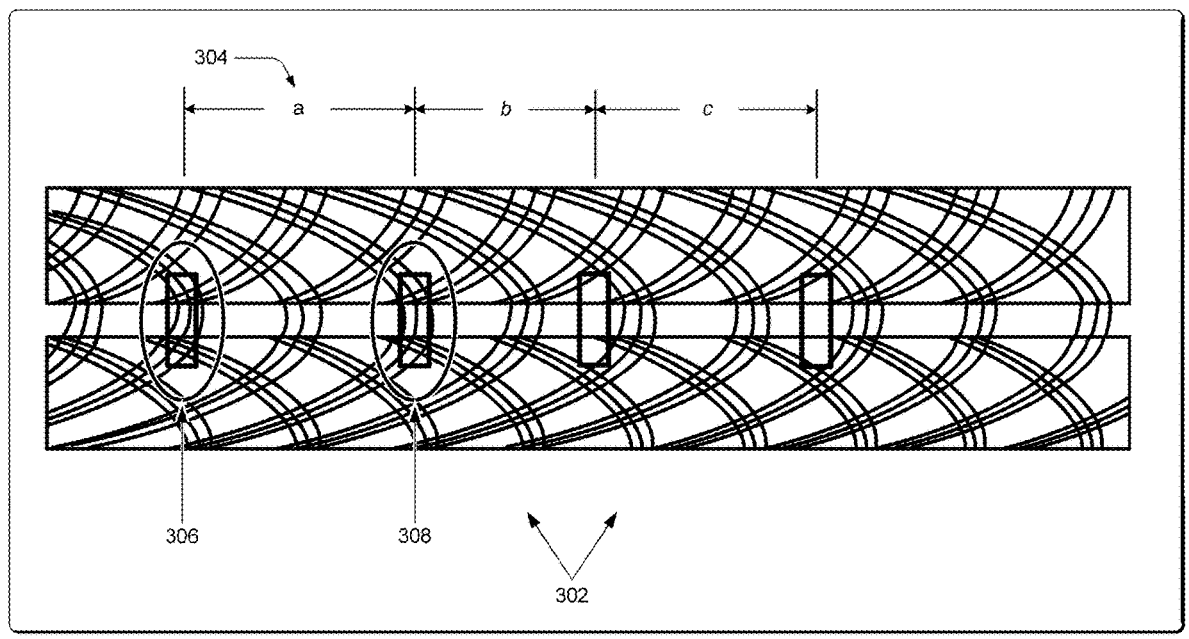
FIG. 3 is a diagram of spans between adjacent bearings selected so that over a range of excitation frequencies, only two adjacent bearings undergo increased vibration to spare other bearings from increased vibrational wear.

As shown in FIG. 3, it is not always practical to avoid resonance because the ESP, or ESP section, may be operated over a wide range of excitation frequencies 302 dictated by the application, one of which may coincide with the natural frequency of a span "a" 304 between bearings 306 & 308. In this case, resonance of the overall machine is minimized by varying the bearing spacings "a," "b," and "c" along the shaft(s) 102 significantly enough to avoid more than one nearby span being excited at any given excitation frequency. Also, any span may be chosen to cancel out natural frequencies of nearby spans.

Example ESP Configurations

Example Pump

Figure 4:
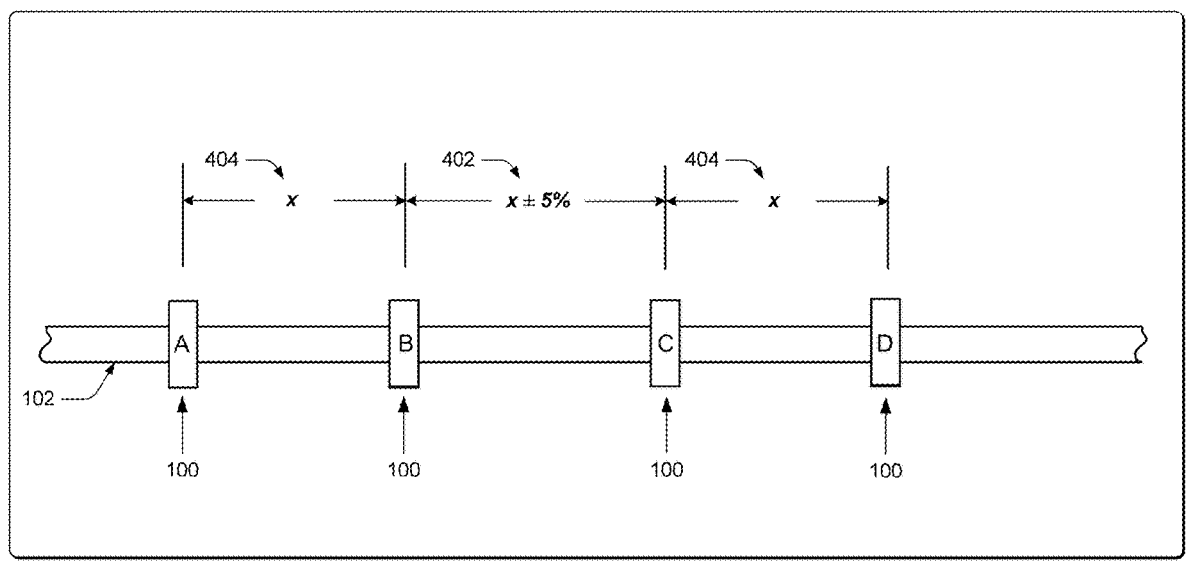
FIG. 4 is a diagram of example bearing spans on a shaft of an ESP pump for reducing vibrational wear of the radial bearings and the shaft, in which a middle span varies from adjacent spans.

FIG. 4 shows an example shaft 102 and bearing 100 configuration in an example ESP pump section. In an implementation, radial bearings 100, such as ARZ ceramic bearings, are spaced along the shaft 102 at a nominal standard spacing, at approximately ten inch intervals, for example, but which on the example shaft 102 is varied from the standard spacing to reduce or avoid vibration. Using four successive ARZ radial bearings A, B, C, D, an example anti-vibration spacing 402 between middle bearings B and C may be at least 0.50 inch different (approximately 5% different) than the nominal ten inch spacing 404 between bearings A and B and between C and D.

Example Protector

Figure 5:
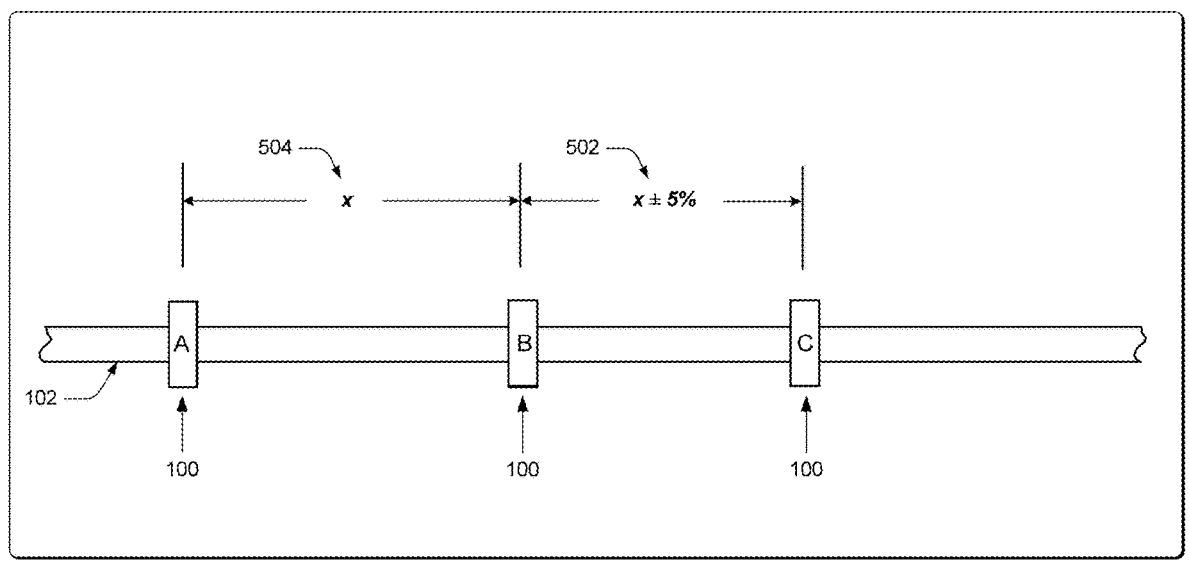
FIG. 5 is a diagram of example bearing spans on a shaft of an ESP protector for reducing vibrational wear of the radial bearings and the shaft, in which a first bearing span varies from a second bearing span by at least five percent.

FIG. 5 shows an example shaft 102 and bearing 100 configuration in an example ESP protector section. Conventional radial bearings 100 for a protector module within an ESP protector section are spaced along the shaft 102 at a fixed interval determined by the length of the ESP protector section. In an implementation, using two adjacent protector modules in an ESP stack, with successive bearing spans AB and BC at a nominal standard length, such as ten inches, an example anti-vibration spacing 502 for span BC may be at least 0.5 inch different (e.g., 5%) than the nominal spacing 504 of span AB. For more bearing spans, the length of each successive bearing span for adjacent protector modules is at least 5% different from the length of each neighboring bearing span.

Example Motor

Figure 6:
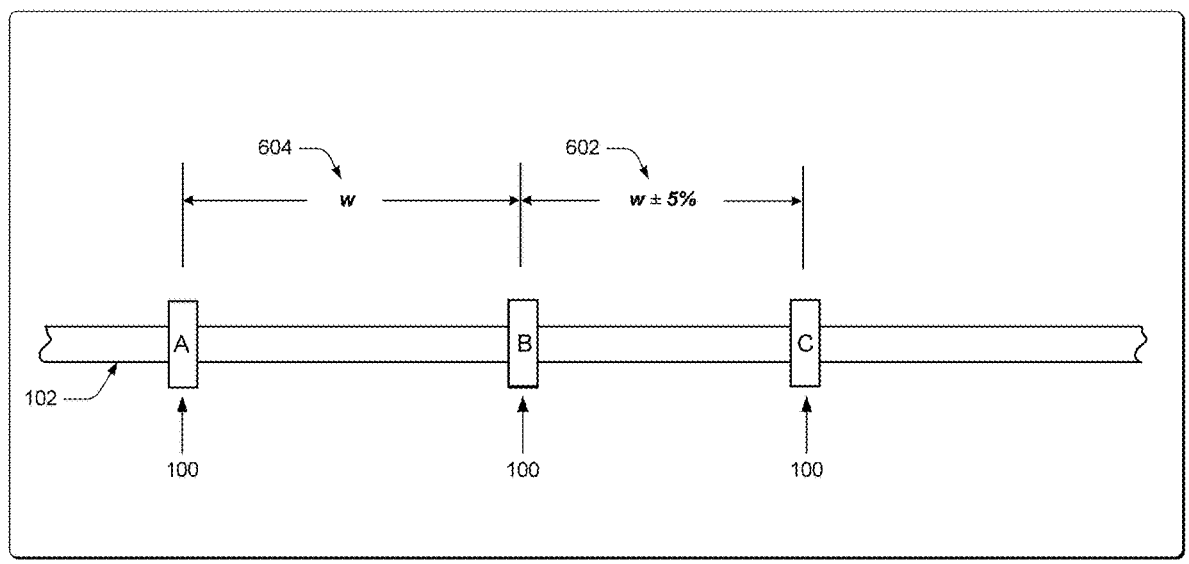
FIG. 6 is a diagram of example bearing spans on a shaft of an ESP motor for reducing vibrational wear of the radial bearings and the shaft, in which a first bearing span varies from a second bearing span by at least five percent.

FIG. 6 shows an example shaft 102 and bearing 100 configuration for example ESP motor sections. Conventional radial bearings 100 for a motor section in an ESP stack are spaced along the shaft 102 at a fixed interval determined by the length of each rotor section. In an implementation, using two adjacent motor sections in an ESP stack, with successive bearing spans AB and BC at a nominal standard length, such as ten inches, an example anti-vibration spacing 602 for span BC may be at least 0.5 inch different (e.g., 5%) than the nominal ten inch spacing 604 of span AB. The length of each successive bearing span for adjacent motor sections is at least 5% different from the length of each neighboring bearing span.

Figure 7:
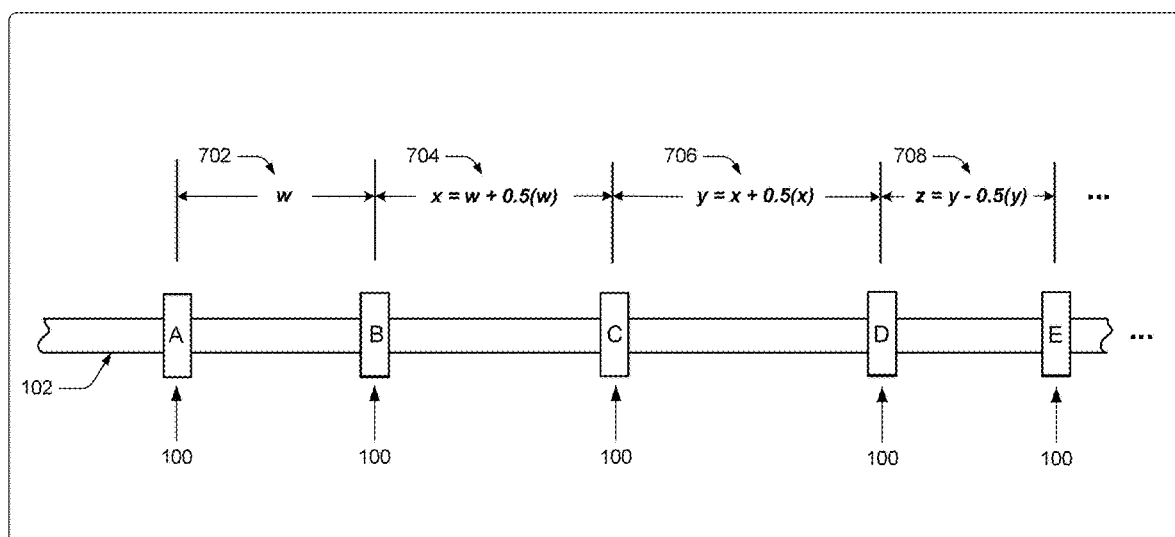
FIG. 7 is a diagram of example successive bearing spans on a shaft for reducing vibrational wear of the radial bearings and the shaft, in which successive bearing spans vary from each other by at least five percent.

FIG. 7 shows multiple bearing spans w, x, y, z for multiple motor sections, multiple protector sections, or multiple pump sections in series, in an ESP stack. Beginning with a nominal bearing span of "w" 702, the length of each succeeding bearing span for adjacent sections is at least 5% different from the length of each neighboring bearing span. Thus, adjacent bearing span "x" 704 can be w+0.5(w), bearing span "y" 706 can be x+0.5(x), bearing span "z" 708 can be y−0.5(y), and so forth. A succeeding bearing span can be 5% longer or 5% shorter than its neighboring bearing spans.

Example Methods

Figure 8:
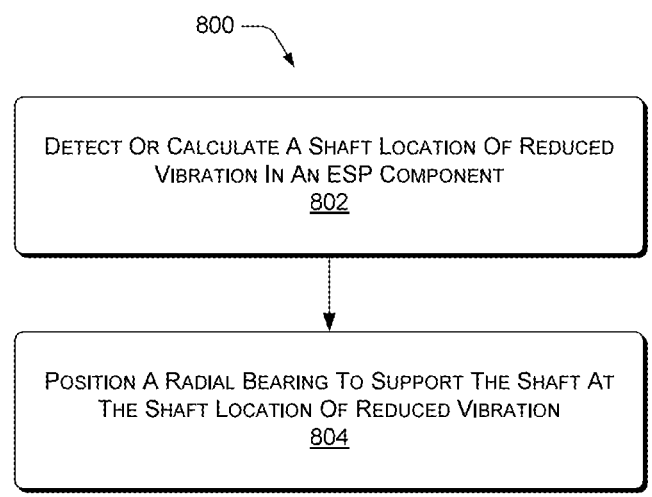
FIG. 8 is a flow diagram of an example method of constructing an ESP component with a radial bearing placed for low wear.

FIG. 8 shows an example method of constructing an ESP component with anti-vibration bearings to reduce wear. In the flow diagram, operations are shown in individual blocks.

At block 802, a shaft location of reduced vibration in the ESP component is detected or calculated.

At block 804, a radial bearing is positioned to support the shaft at the shaft location of reduced vibration.

Figure 9:
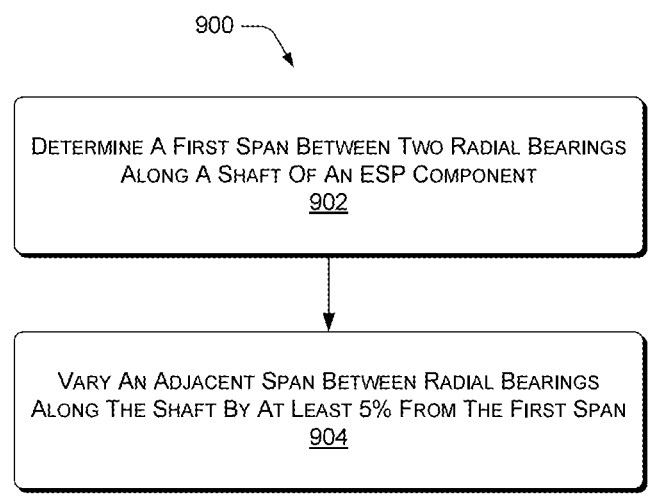
FIG. 9 is a flow diagram of an example method of spacing bearings in an ESP component for low wear.

FIG. 9 shows another example method of constructing an ESP component with anti-vibration bearings to reduce wear. In the flow diagram, operations are shown in individual blocks.

At block 902, a first span between two radial bearings along a shaft of the ESP component is determined.

At block 904, an adjacent span between radial bearings along the shaft is varied by at least 5% from the first span to avoid areas of high vibration in the ESP component.

Conclusion

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. An electric submersible pump (ESP) system, comprising:
 an ESP section;
 a shaft for rotation in the ESP section; and
 a plurality of bearings spaced along the shaft and configured to provide radial support of the shaft, wherein each pair of adjacent bearings is spaced from each other along the shaft by a bearing span having a length, wherein neighboring bearing spans within the ESP section have different lengths, such that if a natural frequency of one bearing span coincides with an excitation frequency of the ESP section in operation, natural frequencies of neighboring bearing spans will not coincide with the excitation frequency of the ESP section in operation, thereby reducing overall resonance of the ESP section.

2. The ESP system of claim 1, wherein the length of each successive bearing span along the shaft is at least 5 percent different from the length of each neighboring bearing span.

3. The ESP system of claim 1, wherein the bearings are positioned at locations of reduced vibration along the shaft.

4. The ESP system of claim 1, wherein the ESP section is an electric submersible pump.

5. The ESP system of claim 1, wherein the ESP section is a motor.

6. The ESP system of claim 1, wherein the ESP section is a protector.

* * * * *